United States Patent [19]
Reynolds et al.

[11] 3,722,217
[45] Mar. 27, 1973

[54] AUXILIARY HYDRAULIC POWER SUPPLY

[75] Inventors: Richard W. Reynolds; Kent Weber, both of Rockford, Ill.

[73] Assignee: Sundstrand Corporation, Rockford, Ill.

[22] Filed: Mar. 3, 1971

[21] Appl. No.: 120,424

[52] U.S. Cl. ............... 60/39.48, 60/37, 60/39.09 R, 73/116, 73/168, 417/405
[51] Int. Cl. ............................................. F04b 17/00
[58] Field of Search ..... 60/39.09 R, 39.48, 39.46, 37; 73/116, 168; 417/405

[56] References Cited

UNITED STATES PATENTS

| | | | |
|---|---|---|---|
| 2,890,843 | 6/1959 | Attinello | 60/39.09 R |
| 2,926,492 | 3/1960 | Flanagan | 60/39.48 |
| 2,959,004 | 11/1960 | Greiner | 60/39.48 |
| 3,138,928 | 6/1964 | Oppenheimer | 60/39.48 |
| 3,099,133 | 7/1963 | Singelmann | 60/39.48 |
| 3,516,251 | 6/1970 | Andrews | 60/39.48 |

FOREIGN PATENTS OR APPLICATIONS 861,735  2/1961  Great Britain.....................60/39.48

Primary Examiner—Douglas Hart
Attorney—Hofgren, Wegner, Allen, Stellman & McCord

[57] ABSTRACT

An emergency hydraulic power supply for providing hydraulic power to an aircraft system in event of engine failure including a hydraulic pump, a hot gas turbine for driving the pump, a decomposition chamber for decomposing fuel to provide hot gas for driving the turbine, a fuel storage tank, pump means for delivering fuel from the tank to the decomposition chamber, conduit means connecting the pump outlet and the decomposition chamber, means for conducting hot gas from the decomposition chamber to the fuel tank for pressurizing the fuel to force the latter toward the pump means, means utilizing tank pressure for purging the conduit means on pump shutdown, and coupling means for using external fluid under pressure for testing operation of various components without decomposition of fuel.

17 Claims, 1 Drawing Figure

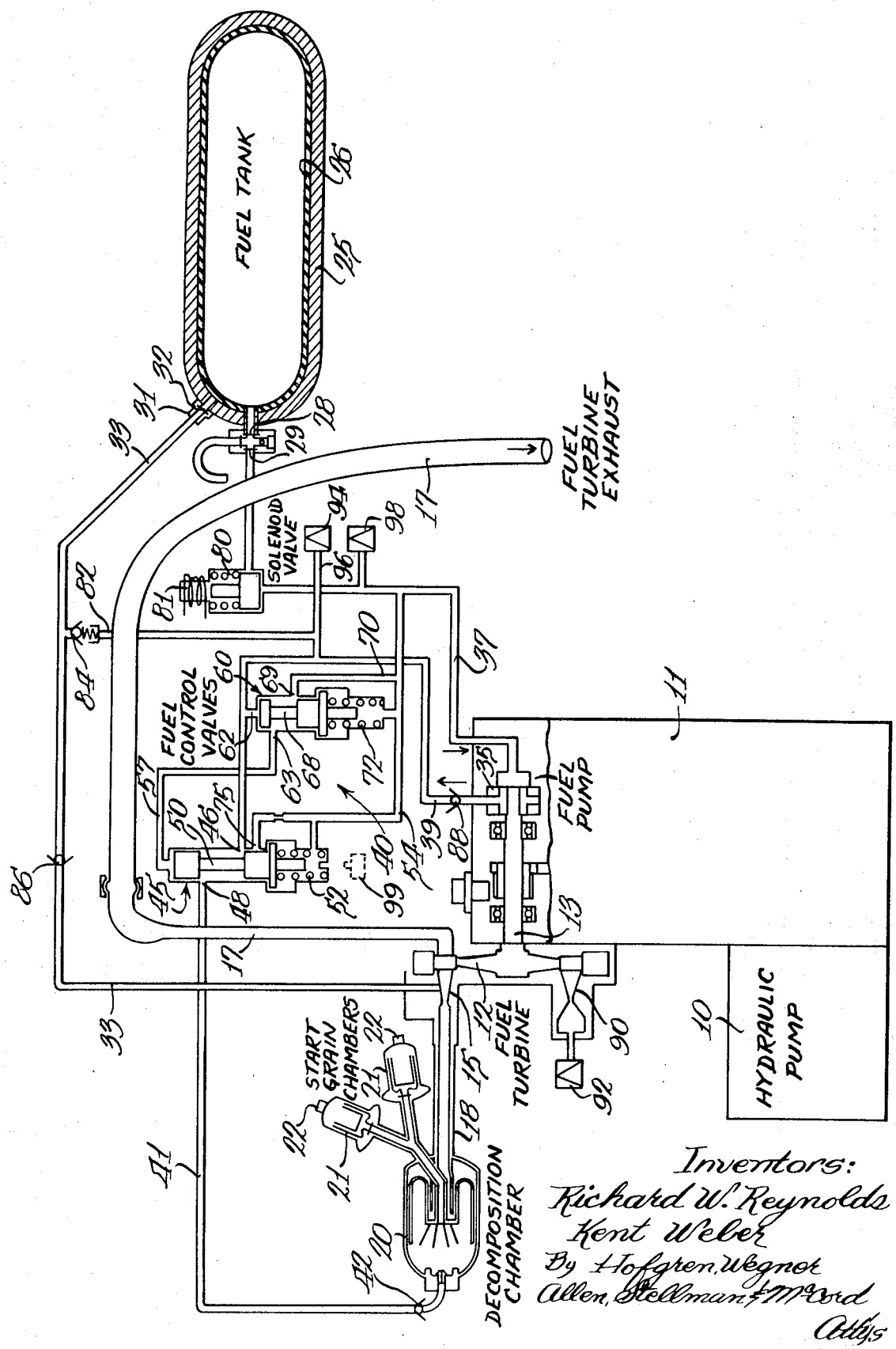

AUXILIARY HYDRAULIC POWER SUPPLY

BACKGROUND OF THE PRESENT INVENTION

In modern aircraft, it is conventional practice to provide a hydraulic power supply which includes a pump for delivering fluid under pressure to operate various auxiliary systems such as leading edge slats and trailing edge flaps. It has been customary to drive the hydraulic pump by power derived in one way or another from the main aircraft engines. In some arrangements, for example, the hydraulic pump is driven by means of an air turbine operated by air bled from an air supply associated with jet engines. Reliable operation of the pump is obtained in such arrangements as long as the main engines operate satisfactorily. In event of failure of the main engines, it is desirable to provide for emergency hydraulic power to operate the airfoil surfaces sufficiently to safely manipulate the aircraft to a controlled landing, in preference to loss of all steering ability. The present invention relates to an auxiliary system for driving a hydraulic pump for a limited period of time to provide fluid under pressure for an emergency landing.

SUMMARY OF THE INVENTION

In a preferred embodiment, an auxiliary hydraulic power supply system embodying the present invention includes a hot gas turbine wheel connected for driving a hydraulic pump, a chamber for decomposition of fuel producing hot gas to drive the turbine, a tank for storing fuel, a pump for delivering fuel from the tank to the decomposition chamber, a discharge conduit communicating the pump outlet and the decomposition chamber, means for pressurizing the tank to force fuel toward the pump inlet, and means utilizing tank pressure on pump shutdown for purging the discharge conduit between the pump and the decomposition chamber in order to ensure that decomposition of heated fuel under pressure occurs in the decomposition chamber and is not retained in the discharge conduit under circumstances which might lead to untimely explosion at inappropriate locations.

In the preferred system illustrated and described herein, the fuel tank comprises an outer enclosure and an inner liner which contains the fuel, and the pressurization system utilizes hot gas taken from the conduit between the decomposition chamber and the hot gas turbine nozzle for purposes of pressurizing the outer tank enclosure to collapse the inner liner and force the fuel toward the pump.

As shown in the preferred embodiment, the fuel pump is driven by the hot gas turbine, and flow control valve means in the discharge conduit regulates fuel flow to the decomposition chamber in a manner to provide substantially constant speed turbine operation. In order to provide for purging on shutdown, a purge conduit connects the discharge conduit with the pressurization conduit supplying pressurization gas to the fuel tank. During turbine and pump operation, a valve in the purge conduit isolates the discharge conduit from the pressurization conduit, but on shutdown such valve permits communication of tank pressure from the pressurization conduit to the discharge conduit to force fuel from the flow control valve means and the discharge conduit into the decomposition chamber. A valve in the discharge conduit adjacent the pump outlet is normally opened by pump outlet pressure during pump operation and normally closed during purging so that purge gas is directed through the control valve means and to the combustion chamber. Additionally, a bleed valve in the pressurization conduit is normally opened by hot gas during turbine operation in order to pressurize the fuel tank, and is normally closed during purging by tank pressure.

Because of the critical importance of reliability of the system for purposes of preserving life and expensive aircraft, it is desirable to be able to check the system for operability of as many components as possible from time to time, bearing in mind that the system may remain installed in an aircraft for many, many extended hours of operation without occurrence of an emergency which would require auxiliary system operation. Accordingly, the system includes a cold gas nozzle adapted to direct fluid against the turbine blades for testing operation of the turbine shaft and the gearing driven thereby, together with a quick disconnect coupling communicating with the cold gas nozzle for convenient application of an external source of fluid under pressure such as compressed nitrogen in a portable tank. Additionally, a quick disconnect coupling is provided in communication with the discharge conduit between the pump outlet and the flow control valve means to facilitate application of an external source of fluid under pressure for test operation of the flow control valve means. Further, the inlet line to the pump includes a quick disconnect coupling adapted to communicate with atmosphere to prevent pressure buildup during test operation.

It is an object of the present invention to provide a new and improved auxiliary hydraulic power supply system of the character described.

BRIEF DESCRIPTION OF THE DRAWINGS

The drawing is a schematic illustration of an auxiliary hydraulic power supply system embodying the principles of the present invention.

DETAILED DESCRIPTION OF PREFERRED EMBODIMENT

Referring now to the drawing illustrating the preferred embodiment, a hydraulic pump 10 is mounted on a gear box 11 and adapted to be driven by the output shaft in the gear box in turn driven by appropriate gearing for producing the desired pump speed. During normal operation of the aircraft when the main propulsion engines are functioning properly, power may be derived in one form or another from the main engines for input to the gear box to drive the hydraulic pump. For example, bleed air may be derived from a supply associated with one or more jet engines to drive an air turbine wheel providing gear box input. In event of engine failure when emergency power is required to safely land the aircraft, according to the present invention use is made of a hot gas turbine wheel 12 on a shaft 13 connected by appropriate gearing in box 11 to rotate the pump 10.

The turbine wheel 12 is formed at the periphery with suitable axial flow impulse blading, and a hot gas nozzle 15 is arranged to direct hot gas to the blades to rotate the wheel. Spent gas is directed overboard to atmosphere through an exhaust system 17. Hot gas is supplied to the nozzle 15 through a conduit 18 leading from a chamber 20 formed for combustion or decomposition of appropriate fuel. In order to ignite fuel in the decomposition chamber 20, there may be one or more starting devices associated with the chamber. As illustrated, there are two start chambers 21 adapted to contain a solid fuel which may be ignited by ignition devices as at 22. If the maximum period of operation of the auxiliary system is limited to something on the order of 5 minutes, it may be necessary to utilize only one starting device 21. On the other hand, if the system has a capability for longer periods of operation on the order of 20 minutes, it is desirable to utilize more than one starting device, because it is conceivable that the main engines might fail under circumstances requiring initiation of system operation, then restart, permitting shutdown of the auxiliary system, and fail again requiring restart of the auxiliary system.

Fuel is stored in a tank comprising an outer protective enclosure 25 and an inner liner or receptacle 26 containing the fuel supply. Under normal standby conditions, the filled liner 26 is closed by hermetically sealed burst discs as at 28 and 29 which are adapted to be ruptured on application of suitable pressure to the fuel on the order of 200 psi, for example. In order to pressurize the outer enclosure 25 and collapse the inner liner 26 to force fuel from the tank toward the decomposition chamber, the outer enclosure 25 includes a fitting 31 with a hermetically sealed burst disc 32 adapted to be ruptured by the application of pressurization fluid through a conduit 33.

In order to deliver fuel from the storage tank 26 to the decomposition chamber 20, use is made of a centrifugal pump 35 driven by the turbine wheel 12. Fuel is supplied from the tank to the pump inlet through an inlet conduit 37. Fuel is supplied from the pump to the decomposition chamber through an outlet conduit 39, flow control valve means 40 and a conduit 41 leading from the valve means to the chamber 20 through a check valve 42.

The flow control valve means 40 is the subject of a separate application of Richard W. Reynolds, Ser. No. 16,841 filed Mar. 5, 1970, now U. S. Pat. No. 3,660,977 issued May 9, 1972 and assigned to the assignee of this application. Briefly, a main control valve 45 includes an inlet port 46 communicating with conduit 39 and an outlet port 48 communicating with conduit 41. The inlet port 46 and the outlet port 48 intersect a valve bore housing a valve member having enlarged opposite ends and an intermediate reduced portion 50 adapted to communicate the ports 46 and 48 when the valve member is positioned as illustrated. The valve member is biased upwardly toward the position illustrated by a spring 52 acting against the lower end of the valve member in a chamber communicating with a conduit 54 leading from inlet conduit 37. The valve member is adapted to be moved downwardly to a position where the upper land blocks communication of the valve bore with the outlet port 48 by means of fluid pressure applied to the upper end of the valve member through a conduit 57 controlled by a pilot valve 60.

The pilot valve 60 senses the pressure of fluid in the outlet conduit 39, and when the pressure rises sufficiently in the outlet conduit, a pressure signal is transmitted through the passage 57 to close the valve 45.

Valve 60 includes a valve bore having an inlet port 62 communicating with conduit 39 and an outlet port 63 communicating with conduit 57. In the valve bore a valve member includes enlarged opposite ends and an intermediate reduced portion 65 normally positioned to communicate the port 63 with a drain port 69 leading through conduit 70 to conduit 54. The pilot valve member is biased upwardly toward the position illustrated by spring 72 acting against the lower end of the valve member in a chamber communicating with conduit 54.

In operation, the main valve 45 is either open or closed, and is normally maintained in the open position illustrated by spring 52 when the pressure of fluid in the outlet conduit 39 does not exceed the spring setting of the pilot valve 60. When the pressure in the conduit 39 rises above a predetermined value, the pilot valve member is moved downwardly from the position illustrated to a position where the inlet port 62 communicates with the outlet port 63, supplying fluid under pressure through the conduit 57 to the upper end of the main valve member to move the latter to a closed position where inlet port 46 communicates with a drain port 75 communicating with passage 54. The reduction in flow to the decomposition chamber and to the turbine have the effect of reducing the speed of the fuel pump and thereby reducing the pressure of fluid in the conduit 39. When the pilot valve member rises again, pressure is removed from the upper end of the main valve member and the latter moves to open position. In this way, the speed of the turbine is controlled to be substantially constant as described in greater detail in the aforementioned copending application.

In order to pressurize the fuel in the storage tank, hot gas is bled through conduit 33 from a position adjacent the hot gas nozzle 15 at a place where pressure will be appropriate for the pressurization desired in the fuel tank. For example, if the static pressure at the inlet to nozzle 15 is on the order of 500 psi, pressurization gas may be bled ahead of the nozzle outlet at a place where the pressure is about 200 psi.

In order to put the system in operation from a standby status, an igniter 22 is electrically energized through circuit means (not illustrated) which starts combustion of the solid fuel in the chamber 21. The hot gas products of combustion pass into the decomposition chamber 20 and then to the hot gas nozzle 15 to start operation of the turbine wheel 12. Rotation of the turbine wheel has the effect of starting operation of the pump 35 to supply fuel from the storage tank to the decomposition chamber by the time the fuel in the start chamber 21 is exhausted. In order to control flow of fuel from the storage tank to the fuel pump, the inlet conduit 37 preferably includes an on-off valve 80 normally spring biased to the closed position illustrated and adapted to be moved to an open position by solenoid means 81 adapted to be remotely energized by circuitry (not illustrated) at the same time that the igniter 22 is energized.

On shutdown of the system, when the valve 80 is closed to discontinue the supply of fuel to the pump 35, it is desirable to purge the conduit means between the pump and the decomposition chamber in a way such that fuel is forced from the conduit means into the decomposition chamber in order to prevent undesired explosion in the conduit means. Accordingly, a purge conduit 82 communicates with the outlet conduit 39 ahead of the control valve means and leads to the pressurization conduit 33. The conduit 82 includes a spring biased check valve 84 which is normally closed by pump outlet pressure during pump operation, but adapted to be opened by tank pressure on pump shutdown so that the pressure of gas in the outer tank enclosure 25 is effective to purge the conduit 82, the valve means 40 and the conduit 41 by forcing the fluid into the decomposition chamber 20 where it may be dissipated under adequately controlled conditions. During normal operation of the turbine wheel 12 and the pump 35, the pressure of hot gas in the conduit 33 has the effect of opening a check valve 86 in the conduit 33 to supply pressurizing gas to the storage tank. During shutdown the check valve 86 is closed by tank pressure to permit the purging operation. In order to further isolate the purging operation, the discharge conduit 39 includes a check valve 88 adjacent the pump outlet which is normally opened during pump operation and closed during pump shutdown.

It will be understood that the nature of the system as an auxiliary apparatus may result in its existence for extended periods of time in standby condition without operation under impetus involving decomposition of fuel in the chamber 20. Nevertheless, because of the critical importance of the system, it is desirable that it admit of testing from time to time to assure that it remains in a state of reliable readiness for operation in event of emergency. Accordingly, provision is made for testing various components of the system by application of external pressure for checking operation of the turbine wheel and parts rotated thereby, as well as the control valve means.

More particularly, a cold gas nozzle 90 is associated with the turbine wheel 12 in a manner to direct cold gas against the turbine blading for operation sufficient to determine that the rotatable parts are free in event they are needed. The cold gas nozzle communicates with a quick disconnect coupling 92 of conventional construction which facilitates application of an external source of pressure such as a tank of compressed nitrogen.

Additionally, the valve means 40 may be checked by means of a quick disconnect coupling 94 on a conduit 96 communicating with pump outlet conduit 39. The coupling 94 is similarly adapted to accept application of external pressure such as may be provided by a tank of compressed nitrogen. In order to prevent any pressure buildup in the inlet conduit 37 during testing, coupling 98 is provided in communication with conduit 37 to connect the latter to atmosphere during testing. In order to verify operation of the main control valve 45, the movable valve member may be formed with an extension at the lower end adapted to actuate an indicator illustrated diagrammatically in broken lines at 99.

It is believed that operation of the system ought to be understood from the description hereinabove. In one preferred system, hot gas is bled at about 200 psi for pressurizing the fuel tank. As a result, the pressure at the inlet to the fuel pump is on the order of 200 psi while the pump develops pressure on the order of 1,000 psi at the outlet. In order to test the system for operability, gas may be applied to the couplings 92 and 94 at about 1,000 psi.

We claim:

1. In a drive system, a rotary turbine wheel, a chamber for decomposition of fuel to provide hot gas to drive the turbine, a fuel tank for supplying fuel for the decomposition chamber, a pump for pumping fuel from the fuel tank to the decomposition chamber, a discharge conduit communicating the pump outlet and the decomposition chamber, means for pressurizing the fuel tank to force fuel to the pump, a purge conduit connecting the discharge conduit and the tank pressurizing means including a check valve adapted to be closed against the pressurizing means by pump discharge pressure and adapted to be opened by the pressurizing means on pump shutdown.

2. A combination as defined in claim 1 including a check valve in the pump discharge conduit adapted to be opened by pump discharge pressure and adapted to be closed by the pressurizing means on purging after pump shutdown.

3. A combination as defined in claim 1 wherein the means for pressurizing the fuel tank comprises a pressurizing conduit for bleeding hot gas from the decomposition chamber ahead of the turbine wheel.

4. A combination as defined in claim 3 including a valve in the pressurization conduit normally opened during pump operation to supply hot gas for pressurizing the tank and normally closed during pump shutdown by pressurization gas.

5. A hydraulic power supply system comprising, a hydraulic pump, gearing connected to drive the pump, a rotary turbine wheel connected to drive the gearing, a chamber for decomposition of fuel to supply hot gases to drive the turbine, an exhaust for conducting spent gases to atmosphere, a fuel tank including an outer enclosure and an inner liner for containing fuel for the decomposition chamber, a fuel pump for delivering fuel from the tank to the decomposition chamber, a fuel inlet conduit connecting the tank to the fuel pump, an on-off valve in the inlet conduit, a fuel outlet conduit connecting the fuel pump and the decomposition chamber, pressurizing means for supplying fluid under pressure to the tank outer enclosure for collapsing the inner liner to force fuel to the fuel pump, a purge conduit connecting the fuel pump outlet conduit and the pressurizing means including a valve normally closed by fuel pump outlet pressure to isolate the fuel pump outlet from the pressurizing means during fuel pump operation and normally opened by the pressurizing means during fuel pump shutdown to utilize pressurizing fluid to purge the fuel pump outlet conduit, and a valve adjacent the fuel pump outlet normally opened by pump outlet pressure during fuel pump operation and normally closed by pressurizing fluid during purge.

6. A hydraulic power supply system as defined in claim 5 including a pressurization conduit for supplying hot gases from the decomposition chamber to the fuel tank outer enclosure to pressurize the inner liner, including a check valve in the pressurization conduit normally opened by hot gas during fuel pump operation and normally closed on fuel pump shutdown by pressurization gas.

7. An auxiliary power supply system comprising, a rotary turbine wheel adapted to be driven by hot gas to provide mechanical power, a chamber for decomposition of fuel to produce hot gas, a hot gas conduit connecting the decomposition chamber and the turbine wheel, an exhaust for conducting spent gas from the turbine wheel to atmosphere, a fuel pump driven by the turbine wheel for supplying fuel to the decomposition chamber, a fuel outlet conduit connecting the pump outlet and the decomposition chamber, flow control valve means in the outlet conduit for regulating flow to the decomposition chamber, a fuel tank for storing fuel to be supplied to the decomposition chamber, a fuel inlet conduit connecting the fuel tank and the pump inlet, a pressurization conduit connecting the hot gas conduit and the fuel tank for pressurizing fuel including a check valve normally opened by hot gas during pump operation and normally closed by tank pressure during pump shutdown, and a purge conduit connecting the outlet conduit and the pressurization conduit downstream from the check valve in the latter, including a check valve normally closed by pump outlet pressure during pump operation and normally opened by tank pressure during pump shutdown.

8. A power supply system as defined in claim 7 including a check valve in the pump outlet conduit normally opened by pump outlet pressure during pump operation and normally closed by tank pressure during pump shutdown.

9. A hydraulic power supply system as defined in claim 5 including a nozzle for supplying fluid under pressure to the turbine wheel to drive the latter to test operation of the turbine, the gearing and the pumps, and a quick disconnect coupling communicating with the nozzle for connection of a source of fluid under pressure.

10. An auxiliary power supply system as defined in claim 8 including a quick disconnect coupling communicating with the pump outlet conduit between the check valve in the outlet conduit and the flow control valve means in the outlet conduit for connection of a source of fluid under pressure to test operation of the flow control valve means.

11. An auxiliary power supply system as defined in claim 10 including a quick disconnect coupling communicating with the pump inlet conduit for connecting the latter to atmosphere during testing of the flow control valve means.

12. An auxiliary power supply system as defined in claim 11 including an on-off valve in the pump inlet conduit between the quick disconnect coupling and the tank for blocking communication between the quick disconnect coupling and the tank during testing of the flow control valve means.

13. An auxiliary hydraulic power supply system comprising a hydraulic pump, gearing connected to drive the pump, a turbine wheel connected to drive the gearing, a chamber for decomposition of fuel to provide hot gas for driving the turbine wheel, a hot gas nozzle communicating with the decomposition chamber for directing hot gas against the turbine blades, an exhaust for conducting spent hot gas from the turbine wheel to atmosphere, a fuel tank for storing fuel for the decomposition chamber, a pump for delivering fuel from the tank to the decomposition chamber, a fuel inlet conduit connecting the tank and the fuel pump inlet, a fuel outlet conduit connecting the fuel pump outlet and the decomposition chamber, valve means in the outlet conduit regulating fuel flow to the decomposition chamber, a cold gas nozzle for directing fluid under pressure against the turbine blades to rotate the wheel for testing operation of the gearing and pumps, and a quick disconnect coupling communicating with the cold gas nozzle for connection of a source of fluid under pressure.

14. An auxiliary hydraulic power supply system comprising a hydraulic pump, gearing connected to drive the pump, a turbine wheel connected to drive the gearing, a chamber for decomposition of fuel to provide hot gas for driving the turbine wheel, a hot gas nozzle communicating with the decomposition chamber for directing hot gas against the turbine blades, an exhaust for conducting spent hot gas from the turbine wheel to atmosphere, a fuel tank for storing fuel for the decomposition chamber, a pump for delivering fuel from the tank to the decomposition chamber, a fuel inlet conduit connecting the tank and the fuel pump inlet, a fuel outlet conduit connecting the fuel pump outlet and the decomposition chamber, valve means in the outlet conduit regulating fuel flow to the decomposition chamber, and a quick disconnect coupling communicating with the fuel outlet conduit between the fuel pump and the flow regulating valve means for connection of a source of fluid under pressure for testing operation of the valve means.

15. An auxiliary hydraulic power supply system as defined in claim 14 including a quick disconnect coupling communicating with the fuel inlet conduit for connection of the latter to atmosphere during testing, and an on-off valve in the fuel end of the conduit between the quick disconnect coupling and the tank.

16. An auxiliary hydraulic power supply system as defined in claim 15 including a cold gas nozzle for directing fluid under pressure against the turbine blades to rotate the wheel for testing operation of the gearing and pumps, and a quick disconnect coupling communicating with the cold gas nozzle for connection of a source of fluid under pressure.

17. An auxiliary hydraulic power supply system as defined in claim 16 including a pressurization conduit connecting the decomposition chamber and the fuel tank for pressurizing fuel in the latter, a check valve in the pressurization conduit normally opened by hot gas during fuel pump operation and normally closed by tank pressure during fuel pump shutdown, a purge conduit connecting the fuel pump outlet conduit and the pressurization conduit, a check valve in the purge conduit normally closed by fuel pump outlet pressure during fuel pump operation and normally opened by tank pressure during purging on fuel pump shutdown, and a check valve in the fuel pump outlet normally opened by fuel pump outlet pressure during fuel pump operation and normally closed by purge pressure or test pressure during fuel pump shutdown.

* * * * *